3,421,912
PREVENTION OF GASSING IN INKS AND COATINGS CONTAINING NITROCELLULOSE

Sherman L. Boles, Jr., Short Hills, N.J., assignor to Interchemical Corporation, New York, N.Y., a corporation of Ohio
No Drawing. Filed Mar. 26, 1965, Ser. No. 443,061
U.S. Cl. 106—26                                     3 Claims
Int. Cl. C09d *11/14;* C09d *3/16*

ABSTRACT OF THE DISCLOSURE

Printing ink and coating compositions composed of a pigment dispersed in a solution of nitrocellulose and trihexylene glycol biborate in an oxygenated solvent. The addition of trihexylene glycol biborate prevents the formation of gases due to the interaction of nitrocellulose with other ingredients of the composition.

---

The present invention relates to the prevention of gassing in inks and coatings containing nitrocellulose.

Nitrocellulose is extensively used in both coatings and inks. A problem which is continuously hampering the use of such coatings and inks is the problem of gassing. Substantial amounts of gas begin to accumulate in the coatings and inks particularly if the compositions contain alkaline pigments or other alkaline additives or carbon black pigment, especially finely divided carbon black pigment. The gassing problem becomes even more troublesome if the composition is allowed to stand or be stored for a period of time prior to use. It appears that the nitrocellulose reacts with the alkaline pigments or with other additives to produce gaseous nitrogen oxide and other gaseous products. These gases cause foam in the ink or coating composition, color changes and changes in the body of the ink or coating composition. The sealed container containing the compositions may rupture under the increased pressure of the formed gasses.

One method conventionally used to reduce gassing in nitrocellulose compositions has been to add acids such as citric or benzoic acids to change the alkalinity of the ink or coating composition to an acidic or neutral state. However, such a change in acidity or alkalinity may very well affect the operativeness of the ink or coating. Furthermore, in some instances, gassing has been found to occur even in acid systems such as when hydrite clay or methyl violet are used as pigments. In such cases, the change in alkalinity will have little effect.

I have now discovered a novel composition containing nitrocellulose in which gassing has been markedly reduced or eliminated without altering the acidity or alkalinity of the composition. I find that the addition of trihexylene glycol biborate to an ink or a coating composition containing pigment dispersed in a solution of nitrocellulose in an oxygenated solvent results in an ink or coating composition from which gassing has been substantially eliminated. The gassing is eliminated without otherwise affecting the properties of the ink. The composition to which the trihexylene glycol biborate is added may be any conventional ink or coating composition containing nitrocellulose including R.S., A.S., and S.S. nitrocellulose. The nitrocellulose is in any of the conventional ink or coating liquids, solvents and diluents including ester solvents such as ethyl acetate, butyl acetate and isopropyl acetate, ketones such as methyl ethyl ketone, aromatic diluents such as xylene, toluene and benzene, alkanols such as isopropanol, ethanol and butanol, hydroxy ethers such as ethylene glycol monomethyl ether and ethylene glycol monoethyl ether and glycols such as ethylene glycol, propylene glycol, butylene glycol, diethylene glycol, dipropylene glycol and triethylene glycol. It is in inks containing glycol solvents that the problem of gassing is even more pronounced than in inks containing other solvents for nitrocellulose. However, even in such glycol solvents, the addition of trihexylene glycol biborate in accordance with this invention results in the elimination of gassing.

Among the typical alkaline pigments which had conventionally caused gassing in nitrocellulose containing inks are alumina hydrate, ultramarine, bronze blue or iron blue, lead chromes, zinc yellow, yellow ochers, brown and red haematite, red lake C, molybdated orange, Watchung red, lithol rubine, and lithol red. However, the addition of the trihexylene glycol biborate solves the problem of gassing as it also does in the case of acid pigments such as hydrite clay, methyl violet and alkali blue.

The solvents, pigments and binders are used in proportions conventionally used in the inks. Preferably from 0.10 to 0.45 part and most preferably from 0.15 to 0.25 part of the trihexylene glycol biborate are added for each part by weight of nitrocellulose in the ink. (In the present specification and claims, all proportions are by weight unless otherwise specified.)

The trihexylene glycol biborate may be made in the conventional manner, either by the reaction of two moles of boric acid with 3 moles of hexylene glycol or the reaction of a mole of boric oxide ($B_2O_3$) with three moles of hexylene glycol.

While trihexylene glycol biborate is by far the most effective additive for the prevention of gassing, other triglycol biborates also tend to reduce gassing in nitrocellulose compositions to a lesser extent. For example, the triglycol biborates described in U.S. Patent No. 2,989,468 display tendencies to reduce gassing. These biborates are the reaction products of $\beta$-alkylene glycols having 6 to 10 atoms with a chain of three carbon atoms linking the glycol radical to the borate radical and boric acid.

The following examples will further illustrate the practice of this invention:

Example 1

|  | Parts by wt. |
|---|---|
| Nitrocellulose R.S. damp (70% nitrocellulose, 26% ethanol and 4% water) | 17 |
| 17% fumarated rosin | 13 |
| Triethylene glycol | 67 |
| Alkali blue pigment | 20 |
| Trihexylene glycol biborate | 4 |

The above ingredients are mixed to form an ink. For comparison purposes, a control ink is prepared of the same ingredients and proportions except that the trihexylene glycol biborate is eliminated. The above ink and the control ink are maintained at 180° F. for 16 hours. The control ink displays a substantial amount of gassing and foaming while the ink containing the trihexylene glycol biborate displays little or no gassing or foaming. Also the ink containing the borate displays little or no gassing or foaming after being stored for many months. On the other hand, the control ink displays a great amount of gassing or foaming after the same period of storage.

Example 2

|  | Parts by wt. |
|---|---|
| Nitrocellulose R.S. damp (70% nitrocellulose, 26% ethanol and 4% water) | 18.6 |
| Dibutyl phthalate | 6.0 |
| Carbon black | 6.9 |
| Ethyl acetate | 22.8 |
| Butyl acetate | 5.7 |
| Toluene | 40.0 |
| Trihexylene glycol biborate | 0.5 |

The above ingredients are mixed to form a coating composition which may be stored for six months or longer without signs of gassing. Then the above mixture is thinned to about a 20% solids content by weight by adding a solvent comprising 20% ethyl acetate, 25% ethanol and 55% toluene. The resulting mixture still does not display any gassing. It is applied to automobile bodies and baked to provide an excellent automotive finish.

A composition identical with that set forth above except that the trihexylene glycol biborate is eliminated displays a substantial amount of gassing and gas accumulation upon standing for a period of days or weeks.

Example 3

| | Parts by wt. |
|---|---|
| 30% solution of nitrocellulose R.S. in triethylene glycol | 45.0 |
| 50% solution of 17% fumarated rosin in triethylene glycol | 15.0 |
| Molybdate orange pigment | 25.0 |
| Barium red lake C pigment | 5.5 |
| Rubanox red pigment | 1.25 |
| Clay | 25.0 |
| Triethylene glycol | 3.0 |
| Trihexylene glycol biborate | 6.0 |

The above ingredients are mixed to form an ink which displays no tendency to form gas. The ink has all of the desirable properties of the ink of Example 1.

While there have been described what is at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:
1. A composition consisting essentially of a pigment dispersed in a solution of nitrocellulose and from 0.10 to 0.45 part by weight of trihexylene glycol biborate per part by weight of nitrocellulose in an oxygenated solvent selected from the group consisting of ethyl acetate, butyl acetate, isopropyl acetate, ethanol, butanol, isopropanol, ethylene glycol, propylene glycol, butylene glycol, diethylene glycol, dipropylene glycol, triethylene glycol, ethylene glycol monomethyl ether, ethylene glycol monoethyl ether.

2. A printing ink consisting essentially of an alkaline pigment dispersed in a solution of nitrocellulose and from 0.10 to 0.45 part by weight of trihexylene glycol biborate per part by weight of nitrocellulose in an oxygenated solvent selected from the group consisting of ethyl acetate, butyl acetate, isopropyl acetate, ethanol, butanol, isopropanol, ethylene glycol, propylene glycol, butylene glycol, diethylene glycol, dipropylene glycol, triethylene glycol, ethylene glycol monomethyl ether, ethylene glycol monoethyl ether.

3. The composition of claim 1 wherein said pigment is carbon black.

References Cited

UNITED STATES PATENTS

| 2,894,020 | 7/1959 | McManimie | 260—462 |
|---|---|---|---|
| 3,092,586 | 6/1963 | Dykstra | 260—462 |
| 2,355,889 | 8/1944 | O'Loughlin | 106—14 |
| 2,949,439 | 8/1960 | Fuchsman et al. | 260—45.75 |
| 2,989,468 | 6/1961 | Darling et al. | 252—49.6 |
| 3,131,164 | 4/1964 | Doyle et al. | 260—45.8 |
| 3,131,071 | 4/1964 | Hunter et al. | 106—15 |

FOREIGN PATENTS 398,166   8/1933   Great Britain.

JULIUS FROME, *Primary Examiner.*

JOAN B. EVANS, *Assistant Examiner.*

U.S. Cl. X.R.

106—194, 195